United States Patent
Sakai et al.

(10) Patent No.: US 6,291,074 B1
(45) Date of Patent: Sep. 18, 2001

(54) HEAT-RADIATION REFLECTIVE GLASS

(75) Inventors: Yasuto Sakai; Koichi Ataka, both of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/354,454

(22) Filed: Jul. 15, 1999

Related U.S. Application Data

(63) Continuation of application No. PCT/JP97/00091, filed on Jan. 17, 1997.

(51) Int. Cl.$^7$ ............................................. B32B 15/00
(52) U.S. Cl. ......................... 428/433; 428/426; 428/432
(58) Field of Search ................................. 428/426, 432, 428/433

(56) References Cited

U.S. PATENT DOCUMENTS

| | | |
|---|---|---|
| 4,217,392 | 8/1980 | Vong . |
| 4,294,881 | 10/1981 | Meyer et al. . |

OTHER PUBLICATIONS

Ruzakowski Athey P et al.: "Determining the optical properties of a mixed–metal oxide file, $Co_{3-x-y}Cr_xFe_yO_4$, with spectroscopic ellipsometry and atomic force microscopy"43rd National Symposium of the American Vacuum Society, Philadelphia, PA, USA, Oct. 14–18, 1996, vol. 15, No. 3, Pt. 1, ISSN 0734–2101, Journal of Vacuum Science & Technology May/Jun. 1997 pp. 998–1006.

Greenberg C.B., "Enabling Thin Films for Solar Control Transparencies: A Review" Journal of the Electrochemical Society, vol. 140, No. 11, Nov. 1993, pp. 3332–3337, XP000424507.

Database WPI, Section Ch, Week 9723, Derwent Publications Ltd., London, GB; Class L01, AN 97–255259 XP002041756 & JP 09 086 966 A, Mar. 31, 1997.

Database WPI, Section Ch, Week 9715, Derwent Publications Ltd., London, GB; Class L01, AN 97–161296 XP002041757 & JP 09 030 837 A, Feb. 4, 1997.

*Primary Examiner*—Deborah Jones
*Assistant Examiner*—Bryant Young
(74) *Attorney, Agent, or Firm*—Merchant & Gould P.C.

(57) ABSTRACT

A heat-radiation reflective glass comprising a glass plate and a film formed on the glass plate. The film has composition comprising 65 to 96% by weight of cobalt, 2 to 25% by weight of chromium and 2 to 33% by weight of iron based on the total metal weight per unit area, and has a layer thickness of 10 nm to 70 nm. In another embodiment, the film has composition comprising cobalt, chromium and iron in weight percentages whithin the ranges of 65 to 96% by weight of cobalt, 2 to 25% by weight of chromium and 2 to 33% by weight of iron based on the total metal weight per unit area, in its part on the side coming into contact with the glass plate, and in weight percentages within the ranges that fulfill at least one of conditions i) 2 to 96% by weight of cobalt, 2 to 8% by weight or 18 to 96% by weight of chromium and 2 to 96% by weight of iron and ii) 2 to 96% by weight of cobalt, 2 to 96% by weight of chromium and 2 to 10% by weight of iron based on the total metal weight per unit area, in its part on the outermost side, and has a layer thickness of 10 nm to 70 nm.

5 Claims, 3 Drawing Sheets

HEAT-RADIATION REFLECTIVE GLASS

This application is a continuation of International Application Number PCT/JP97/00091, filed Jan. 17, 1997, pending.

TECHNICAL FIELD

This invention relates to a heat-radiation reflective glass for cars and vehicles or buildings.

BACKGROUND ART

In recent years, heat-radiation reflective glass having a small visible light transmittance is used in glass for cars and vehicles or buildings so that they can be air-conditioned at a lower load and the hotness due to direct sunlight can be reduced. Such heat-radiation reflective glass having a small visible light transmittance is worth using also from the viewpoint of the protection of privacy. Heat-radiation reflective glass that can meet such needs is conventionally obtained by a method of forming a film on the glass surface by vacuum deposition or sputtering of a highly conductive material such as titanium nitride or silver. A method is also available in which an oxide film containing cobalt, iron, chromium or nickel is formed on a glass plate by thermal decomposition.

Of the above film forming methods, however, the method of forming a film by vacuum deposition or sputtering of a highly conductive material such as titanium nitride or silver has the problem of a high production cost. As for the method in which an oxide film is formed on a glass plate by thermal decomposition, the method can be simply operated and can enjoy a low production cost, but has the problem that, depending on the composition of oxide film, the glass with a film formed may cause a great change in transmittance, a deterioration of chemical resistance of the film or a clouding of the film, when subjected to tempering.

DISCLOSURE OF INVENTION

The present invention was made in order to solve these problems. Accordingly, an object of the present invention is to provide a heat-radiation reflective glass that may hardly cause a change in film properties such as transmittance even when subjected to tempering, and can be produced at a low cost.

According to a first embodiment of the present invention, the heat-radiation reflective glass comprises a glass plate and a film formed on the glass plate;

the film having composition comprising cobalt, chromium and iron in weight percentages within the ranges shown below, based on the total metal weight per unit area; and having a layer thickness of from 10 nm to 70 nm.

Cobalt, from 65% to 96%;
chromium, from 2% to 25%; and
iron, from 2% to 33%.

Cobalt may preferably be in a content not more than 90% by weight. Iron or chromium may also preferably be contained in weight percentages that fulfill at least one of the following conditions (1) to (3).

(1): Iron, 10% or less;
(2): chromium, 8% or less; and
(3): chromium, 18% or more.

According to a second embodiment of the present invention, the heat-radiation reflective glass comprises a glass plate and a film formed on the glass plate;

the film having composition comprising cobalt, chromium and iron in weight percentages within the ranges shown as condition (4) below, based on the total metal weight per unit area, in its part on the side coming into contact with the glass plate, and in weight percentages within the ranges that fulfill at least one of conditions (5) and (6) shown below, based on the total metal weight per unit area, in its part on the outermost side; and having a layer thickness of from 10 nm to 70 nm.

(4): Cobalt, from 65% to 96%;
chromium, from 2% to 25%; and
iron, from 2% to 33%.
(5): Cobalt, from 2% to 96%;
chromium, from 2% to 8% or from 18% to 96%; and
iron, from 2% to 96%.
(6): Cobalt, from 2% to 96%;
chromium, from 2% to 96%; and
iron, from 2% to 10%.

In the above condition (4), cobalt may preferably be in a content not more than 90% by weight. The film may have a double layer construction comprised of the part that is on the side coming into contact with the glass plate and the part that is on the outermost side, the latter being superimposed formed on the former.

In the heat-radiation reflective glass according to the first or second embodiment of the present invention, the film properties such as transmittance are very little affected even when the glass is subjected to tempering with heating at a temperature not lower than the distortion point of the glass plate used and not higher than the softening point thereof.

BEST MODE FOR CARRYING OUT THE INVENTION

Preferred embodiments of the heat-radiation reflective glass according to the present invention will be described below with reference to accompanying drawings.

Figure 1:
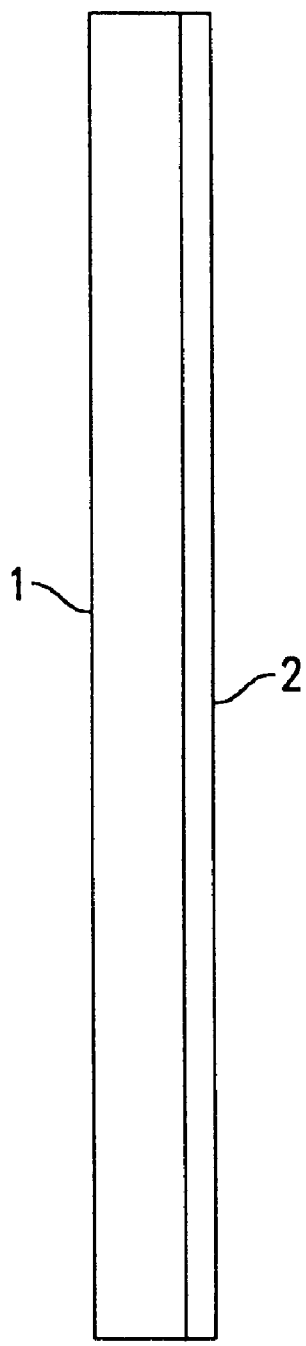
FIG. 1 is a cross section of the heat-radiation reflective glass according to the first embodiment of the present invention.

As shown in FIG. 1, the heat-radiation reflective glass according to the first embodiment of the present invention comprises a glass plate 1 and a film 2 formed on the glass plate. The film has composition comprising 65 to 96% by weight of cobalt, 2 to 25% by weight of chromium and 2 to 33% by weight of iron based on the total metal weight per unit area, and has a layer thickness of from 10 nm to 70 nm. FIG. 1 shows an instance where the film is formed on one side of the glass plate. Alternatively, the film may be formed on each side of the glass plate.

The film according to the present invention may be formed by various processes such as sputtering and vacuum deposition. It is most readily available and preferable to use a process in which compounds of cobalt, chromium and iron are formed into oxide films of cobalt, chromium and iron on the surface of a heated glass plate by thermal decomposition oxidation reaction.

Such a film forming process utilizing thermal decomposition oxidation reaction may include a process in which a solution of metal compounds is coated on a glass plate and thereafter the coating formed is baked, a chemical vapor deposition (CVD) process in which vapors of metal compounds are fed onto a glass plate heated to a high temperature and films are formed by oxidation reaction, a powder process in which powders of metal compounds are sprayed on a glass plate heated to a high temperature, and a spray process in which a spraying solution prepared by dissolving or dispersing metal compounds in an organic solvent or water is sprayed in the form of minute droplets on a glass plate heated to a high temperature, any of which may be used. Of these, the spray process is preferred in view of the readiness to handle and the production cost.

In particular, the film may be formed by the spray process on a high-temperature ribbon-shaped glass produced by floating or the like. This makes it unnecessary to clean and heat the glass plate and hence makes it possible to reduce the production cost.

As the metal compounds used when the film is formed by the spray process, metal compounds of cobalt, chromium and iron are used, and these are dissolved in a solvent to prepare a spraying solution.

Usable cobalt compounds are exemplified by dipropionylmethanecobalt, acetylacetonatocobalt (either divalent salt or trivalent salt is available), cobalt acetate, cobalt chloride, cobalt benzoate, cobalt borate, cobalt bromide, cobalt nitrate, cobalt fluoride, cobalt iodide, cobalt oxalate, cobalt phosphate, cobalt phosphite, cobalt stearate, and cobalt sulfate.

Usable chromium compounds are exemplified by acetylacetonatochromium, chromic acetate, chromous chloride, chromic chloride, chromic formate, chromic fluoride, ammonium chromium sulfate, chromic hydroxide, chromic nitrate, chromic phosphate, potassium chromium sulfate, and chromic sulfate.

Usable iron compounds are exemplified by acetylacetonatoiron, ferrous chloride, ferric chloride, ferric citrate, ammonium ferric oxalate, ammonium ferric sulfate, iron fluoroborate, ferric fluoride, iron fluorosilicate, ferric lactate, ferric nitrate, ferrous oxalate, ferrous phosphate, ferric phosphate, ferrous sulfate, ferric sulfate, and ferrous tartrate.

The solvent for dissolving these metal compounds may include organic solvents such as aromatic compounds, esters, ketones, alcohols and ethers. Toluene is preferably used.

As for the glass plate used, there are no particular limitations on it. Conventional, colorless soda lime silica glass may be used. Colored soda lime glass may also be used, whereby color tones of transmitting or reflecting visible light can be controlled and also commerciality can be effectively improved. In particular, when used as car glass, colored soda lime silica glass having a green appearance can be more beautiful.

In order to decrease visible light transmittance or delicately control color tones, any of nickel, silicon, aluminum, antimony, titanium, zinc, lead, tin, copper, indium, bismuth, vanadium, manganese, zirconium and so forth may be contained in the film in an appropriate quantity so long as the object of the present invention is not damaged.

When the heat-radiation reflective glass according to the present invention is produced by the spray process, preferable content of the metal compounds in the spraying solution must be experimentally predetermined in accordance with the apparatus used. For such content, an optimum range depends on the glass plate temperature at the time of spraying, the nozzle used to spray the solution, the gas exhaust mechanism, the film forming rate and so forth. More specifically, if the amount of the metal compounds in the spraying solution is too small, no sufficient film forming rate can be achieved. If on the other hand it is too large, no good layer thickness distribution can be achieved.

The respective metal compounds in the spraying solution are mixed so as to be contained in the resulting film within the ranges of 65 to 96% by weight of cobalt, 2 to 25% by weight of chromium and 2 to 33% by weight of iron based on the total metal weight per unit area of the film.

If the cobalt is less than 65% by weight or the chromium is more than 25% by weight based on the total metal weight per unit area of the film formed, the film may have a too large visible light transmittance or may have a poor alkali resistance when the glass plate is subjected to tempering with heating. This is presumably because the heat energy at the time of tempering causes sodium, an alkali component contained in the glass, to react with the chromium contained in the film to produce sodium chromate, simultaneously causing a change in state of cobalt. More specifically, it is presumed that the change in state of cobalt causes a change in visible light transmittance, and the sodium chromate produced causes a deterioration of alkali resistance. Hence, the cobalt must be in a content of not less than 65% by weight and the chromium not more than 25% by weight based on the total metal weight per unit area.

In order to impart acid resistance of the film, the chromium must be in a content not less than 2% by weight and also the iron 2 to 33% by weight based on the total metal weight per unit area.

If the cobalt is in a content more than 90% by weight, in particular, more than 96% by weight, based on the total metal weight per unit area, the oxide film may become clouded presumably because of the cobalt contained in it when the glass plate is subjected to tempering with heating. In such an instance, the beautiful appearance may be spoiled. Hence, the cobalt must be in a content not more than 96% by weight, and preferably not more than 90% by weight based on the total metal weight per unit area.

In order to cause less change in visible light transmittance and maintain a good alkali resistance, the cobalt may preferably be in a content not less than 70% by weight and the chromium not more than 15% by weight based on the total metal weight per unit area.

Meanwhile, from the viewpoint of acid resistance of the film, it is not preferable for the iron to be in a content more than 10% by weight or the chromium more than 8% by weight and less than 18% by weight based on the total metal weight per unit area, because a poor acid resistance may result. In general, the acid resistance of heat-radiation reflective films tends to be improved when base materials are subjected to tempering with heating. However, within the above ranges, no good acid resistance can be achieved even after tempering. Hence, when the film is required to have a good acid resistance too, it is preferable to fulfill at least one of three conditions that (1) iron, 10% by weight or less, (2) chromium, 8% by weight or less and (3) chromium, 18% by weight or more, based on the total metal weight per unit area.

The film is formed in a layer thickness not smaller than 10 nm, because no sufficient function required as heat-radiation reflective glass can be retained if it has a layer thickness smaller than that. Meanwhile, it is formed in a layer thickness not larger than 70 nm, because reflection interference color may affect the film to cause an undesirable appearance if it has a layer thickness larger than that.

The second embodiment of the present invention will be described below.

Figure 2:
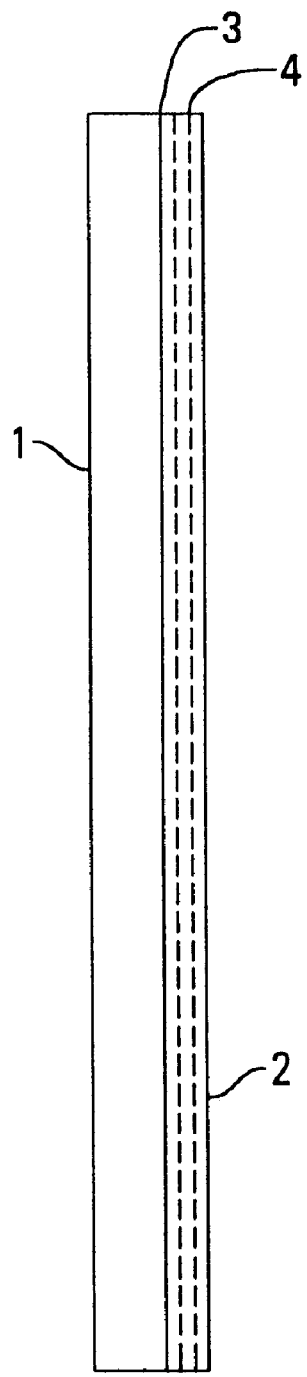
FIGS. 2 and 3 are each a cross section of the heat-radiation reflective glass according to the second embodiment of the present invention.

As shown in FIG. 2, the heat-radiation reflective glass according to the second embodiment of the present invention comprises a glass plate 1 and a film 2 formed on the glass plate. The film 2 has composition comprising cobalt, chromium and iron in weight percentages within the ranges shown as condition (4) below, based on the total metal weight per unit area, in its part 3 on the side coming into contact with the glass plate 1, and in weight percentages within the ranges that fulfill at least one of conditions (5) and (6) shown below, based on the total metal weight per unit area, in its part 4 on the outermost side; and has a layer thickness of from 10 nm to 70 nm.

(4): Cobalt, from 65% to 96%;
  chromium, from 2% to 25%; and
  iron, from 2% to 33%.
(5); Cobalt, from 2% to 96%;
  chromium, from 2% to 8% or from 18% to 96%; and
  iron, from 2% to 96%.
(6): Cobalt, from 2% to 96%;
  chromium, from 2% to 96%; and
  iron, from 2% to 10%.

FIG. 2 shows an instance where the film is formed on one side of the glass plate. Alternatively, the film may be formed on each side of the glass plate.

The film according to this second embodiment is constituted so as to have at least, part coming in contact with the glass surface (hereinafter "glass-side part") and outermost part coming in contact with the air (hereinafter "outermost part"). The glass-side part has a good alkali resistance against alkali components contained in the glass. The outermost part has a good acid resistance against oxygen contained in the air.

Figure 3:
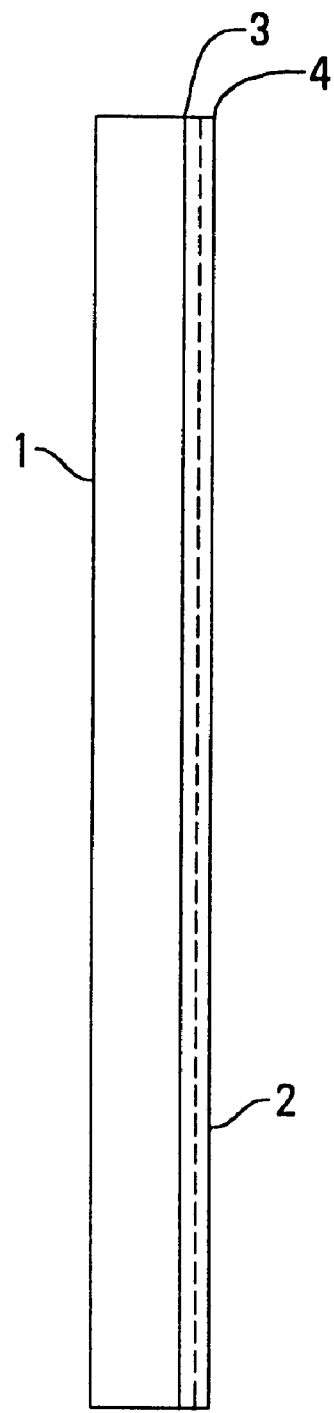

The weight percentages of the metals such as cobalt, held in the total metal weight per unit area, may be within the stated ranges respectively in the glass-side part and outermost part at least. For example, an intermediate part may be present between these glass-side part and outermost part. In such an instance, there are no particular limitations on the weight percentages of the metals present in such an intermediate part so long as the glass plate with a film formed retains the function as the heat-radiation reflective glass. The metals in the intermediate part may be in the same weight percentages as those in either the glass-side part or the outermost part, or may be in such weight percentages that continuously change from the weight percentages in either one part to the weight percentages in the other part. Also, as shown in FIG. 3, the film may be a film 2 having a double layer construction comprised of a glass-side part 3 and an outermost part 4, the latter being superimposed directly on the former without any intermediate part.

The film according to the second embodiment is formed in a layer thickness of from 10 nm to 70 nm for the same reasons as stated in the first embodiment. In order for the alkali resistance and acid resistance of the film to be well exhibited, the glass-side part and the outermost part may each preferably have a thickness not smaller than 5 nm, and more preferably not smaller than 10 nm.

In this second embodiment, the visible light transmittance can be decreased or color tones can be controlled in the whole film by combination of glass-side part and outermost part which have different refractive indexes and color tones. While meeting the demand for improving chemical resistance of the film, the compositional range for each metal in the film can be broad. Hence, the film can also have the feature that its color tones can be controlled in a wide range and with ease.

Like the case of the first embodiment, the film according to the second embodiment may be formed by sputtering or vacuum deposition, and it is most preferable to use the process in which compounds of cobalt, chromium and iron are formed into oxide films of cobalt, chromium and iron on the surface of a heated glass plate by thermal decomposition oxidation reaction. As the film forming process utilizing thermal decomposition oxidation reaction, the same various processes as in the first embodiment may be used, and the spray process is preferred. To form the film of the second embodiment by the spray process, for example, a spraying solution for providing the glass-side part is first sprayed on a heated glass plate to form the glass-side part and then a spraying solution for forming the outermost part is further sprayed thereon to form the outermost part. Between the glass-side part and the outermost part, an intermediate part may be existed.

As the metal compounds, the same metal compounds of cobalt, chromium and iron as used in the first embodiment may be used. The metal compounds may be dissolved in the same organic solvent as used in the first embodiment to prepare spraying solutions for the respective parts. As to the glass used, like the first embodiment, conventional colorless soda lime silica glass or green-colored soda lime silica glass may be used. Also, like the first embodiment, in order to decrease visible light transmittance or delicately control color tones, nickel or the like may be added to the material solution so as to be contained in the film. Preferable content of the metal compounds in the spraying solution must be experimentally predetermined for each of the glass-side part and the outermost part in accordance with the apparatus used, in the same manner as in the first embodiment.

The respective metal compounds in the spraying solution for forming the glass-side part are mixed so as to be contained in the glass-side part within the ranges of 65 to 96% by weight of cobalt, 2 to 25% by weight of chromium and 2 to 33% by weight based on the total metal weight per unit area of that part. The cobalt may preferably be in a content not more than 90% by weight. The cobalt may also preferably be in a content not less than 70% by weight, and the chromium not more than 15% by weight. These ranges of weight percentage are defined for imparting alkali resistance of the film as in the case of the first embodiment.

As for the content of the metal compounds in the spraying solution for forming the outermost part, in order to impart acid resistance, the respective metal compounds are mixed so as to be contained in the outermost part within the ranges of 2 to 96% by weight of cobalt, 2 to 8% by weight or 18 to 96% by weight of chromium and 2 to 96% by weight of iron, or within the ranges of 2 to 96% by weight of cobalt, 2 to 96% by weight of chromium and 2 to 10% by weight of iron, based on the total metal weight per unit area of that part. From the viewpoint of visible light transmittance, the cobalt, chromium and iron may each be within the range of 2 to 96% by weight. However, in order to impart acid resistance of the film, as stated in the first embodiment, the iron must be not more than 10% by weight or the chromium not more than 8% by weight or not less than 18% by weight based on the total metal weight per unit area. In order to prevent the film from becoming clouded, the cobalt may preferably be in a content not more than 90% by weight.

As described above, the heat-radiation reflective glass according to the first embodiment and second embodiment of the present invention causes no damage on film properties such as visible light transmittance, alkali resistance and acid resistance even when subjected to tempering with heating. The film having oxides of cobalt, chromium and iron as film components is formed on the glass plate in such a way that the weight percentages of these metals based on the total metal weight per unit area may be within the stated ranges, and the glass with the film formed is subjected to tempering with heating, at a temperature not lower than the distortion point of the glass plate and not higher than the softening point thereof, whereby heat-treated heat-radiation reflective glass can be produced. The present heat-radiation reflective glass has good film properties and is suited for cars and vehicles or buildings.

Such heat-radiation reflective glass is typified by flat or curved tempered glass, and may optionally have a structure wherein two or more glass plates are put together via plastic such as PVB (polyvinyl butyral).

of the film were determined by high-frequency plasma emission spectroscopic analysis. Results obtained are shown in Table 1.

Next, this heat-radiation reflective glass was subjected to tempering with heating at a temperature of 650° C. for 5 minutes. Thereafter, visible light transmittance of the tempered heat-radiation reflective glass was determined to examine any change before and after the heat treatment. At the same time, the appearance of the film was also examined on whether or not the film became clouded as a result of the tempering. Results obtained are also shown in Table 1.

Two sheets of the same heat-radiation reflective glass as above were also produced, which were respectively

TABLE 1

| | Layer thickness (nm) | Weight percentage | | | Visible light transmittance | | | Sunlight transmittance (%) | Appearance |
|---|---|---|---|---|---|---|---|---|---|
| | | Co (%) | Cr (%) | Fe (%) | Before tempering (%) | After tempering (%) | Change (%) | | |
| Example: | | | | | | | | | |
| 1 | 50 | 81 | 15 | 4 | 32.8 | 33.0 | 0.2 | 31.3 | Good |
| 2 | 60 | 74 | 22 | 4 | 32.1 | 33.1 | 1.0 | 29.8 | Good |
| 3 | 50 | 68 | 22 | 10 | 33.2 | 34.1 | 0.9 | 30.2 | Good |
| 4 | 60 | 84 | 5 | 11 | 29.0 | 29.7 | 0.7 | 28.6 | Good |
| 5 | 60 | 74 | 3 | 23 | 29.4 | 30.4 | 1.0 | 29.2 | Good |
| 6 | 60 | 91 | 5 | 4 | 30.2 | 30.3 | 0.1 | 29.1 | Clouded |
| 7 | 50 | 78 | 9 | 13 | 32.2 | 33.0 | 0.8 | 30.3 | Good |
| 8 | 50 | 67 | 14 | 19 | 31.5 | 32.8 | 1.3 | 30.5 | Good |
| 9 | 50 | 73 | 13 | 14 | 32.1 | 32.5 | 0.4 | 30.8 | Good |
| Comparative Example: | | | | | | | | | |
| 1 | 50 | 68 | 29 | 3 | 33.2 | 36.5 | 3.3 | 30.2 | Good |
| 1 | 50 | 53 | 44 | 3 | 40.6 | 45.5 | 4.9 | 35.7 | Good |

EXAMPLES

The present invention will be described below in greater detail by giving Examples. The present invention is by no means limited to these Examples.

Example 1

Soda lime silica glass with a size of 150×150 mm and a thickness of 3.4 mm and having a green material color was cleaned and dried, and was used as a glass plate serving as a base material. This glass plate was fastened with a hanger and stood for 5 minutes in an electric furnace set at a temperature of 650° C. Thereafter, the glass plate was taken out and a spraying solution prepared by dissolving 12.5 g of dipropionylmethanecobalt (cobalt valence number: 3), 0.62 g of acetylacetonatoiron (iron valence number: 3) and 1.83 g of acetylacetonatochromium in 100 ml of toluene was sprayed on the glass plate by means of a commercially available spray gun under conditions of a spray time of about 10 seconds, an air pressure of 3.0 kg/cm$^2$, an air flow rate of 90 lit./minute and a spray rate of 20 ml/minute to produce heat-radiation reflective glass.

The heat-radiation reflective glass thus obtained was examined on its visible light transmittance and sunlight transmittance, and the weight percentages of cobalt, chromium and iron based on the total metal weight per unit area subjected to tempering with heating in the same manner as the above, and thereafter immersed sheet by sheet in an aqueous 1N sulfuric acid solution and an aqueous 1N sodium hydroxide solution at a temperature of 40° C. for 24 hours, respectively, to test acid resistance and alkali resistance. After the immersion, how the films stood deteriorated was observed to obtain the results as shown in Table 2. In this test, an instance where almost no deterioration was seen was evaluated as "A"; an instance where a deterioration was slightly seen, as "B"; and an instance where a deterioration was clearly seen, as "C".

TABLE 2

| | Alkali resistance | Acid resistance |
|---|---|---|
| Example: | | |
| 1 | A | A |
| 2 | A | A |
| 3 | A | A |
| 4 | A | A |
| 5 | A | A |
| 6 | A | A |
| 7 | A | B |
| 8 | A | B |
| 9 | A | B |

TABLE 2-continued

| | Alkali resistance | Acid resistance |
|---|---|---|
| Comparative Example: | | |
| 1 | C | A |
| 2 | C | A |

Example 2

Heat-radiation reflective glass was produced in the same manner as in Example 1 except that the spraying solution was prepared by dissolving 11.24 g of dipropionylmethanecobalt (cobalt valence number: 3), 0.64 g of acetylacetonatoiron (iron valence number: 3) and 3.13 g of acetylacetonatochromium in 100 ml of toluene. The glass obtained was subjected to tempering with heating similarly. Evaluation was also made in the same manner.

The results are shown together in Tables 1 and 2.

Example 3

Heat-radiation reflective glass was produced in the same manner as in Example 1 except that the spraying solution was prepared by dissolving 11.18 g of dipropionylmethanecobalt (cobalt valence number: 3), 1.28 g of acetylacetonatoiron (iron valence number: 3) and 2.53 g of acetylacetonatochromium in 100 ml of toluene. The glass obtained was subjected to tempering with heating similarly. Evaluation was also made in the same manner.

The results are shown together in Tables 1 and 2.

Example 4

Heat-radiation reflective glass was produced in the same manner as in Example 1 except that the spraying solution was prepared by dissolving 12.50 g of dipropionylmethanecobalt (cobalt valence number: 3), 1.95 g of acetylacetonatoiron (iron valence number: 3) and 0.55 g of acetylacetonatochromium in 100 ml of toluene. The glass obtained was subjected to tempering with heating similarly. Evaluation was also made in the same manner.

The results are shown together in Tables 1 and 2.

Example 5

Heat-radiation reflective glass was produced in the same manner as in Example 1 except that the spraying solution was prepared by dissolving 11.18 g of dipropionylmethanecobalt (cobalt valence number: 3), 3.33 g of acetylacetonatoiron (iron valence number: 3) and 0.49 g of acetylacetonatochromium in 100 ml of toluene. The glass obtained was subjected to tempering with heating similarly. Evaluation was also made in the same manner.

The results are shown together in Tables 1 and 2.

Example 6

Heat-radiation reflective glass was produced in the same manner as in Example 1 except that the spraying solution was prepared by dissolving 13.79 g of dipropionylmethanecobalt (cobalt valence number: 3), 0.61 g of acetylacetonatoiron (iron valence number: 3) and 0.60 g of acetylacetonatochromium in 100 ml of toluene. The glass obtained was subjected to tempering with heating similarly. Evaluation was also made in the same manner.

The results are shown together in Tables 1 and 2.

Example 7

Heat-radiation reflective glass was produced in the same manner as in Example 1 except that the spraying solution was prepared by dissolving 11.85 g of dipropionylmethanecobalt (cobalt valence number: 3), 1.27 g of acetylacetonatoiron (iron valence number: 3) and 1.88 g of acetylacetonatochromium in 100 ml of toluene. The glass obtained was subjected to tempering with heating similarly. Evaluation was also made in the same manner.

The results are shown together in Tables 1 and 2.

Example 8

Heat-radiation reflective glass was produced in the same manner as in Example 1 except that the spraying solution was prepared by dissolving 11.17 g of dipropionylmethanecobalt (cobalt valence number: 3), 2.56 g of acetylacetonatoiron (iron valence number: 3) and 1.27 g of acetylacetonatochromium in 100 ml of toluene. The glass obtained was subjected to tempering with heating similarly. Evaluation was also made in the same manner.

The results are shown together in Tables 1 and 2.

Example 9

Heat-radiation reflective glass was produced in the same manner as in Example 1 except that the spraying solution was prepared by dissolving 11.18 g of dipropionylmethanecobalt (cobalt valence number: 3), 1.96 g of acetylacetonatoiron (iron valence number: 3) and 1.90 g of acetylacetonatochromium in 100 ml of toluene. The glass obtained was subjected to tempering with heating similarly. Evaluation was also made in the same manner.

The results are shown together in Tables 1 and 2.

Comparative Example 1

Heat-radiation reflective glass was produced in the same manner as in Example 1 except that the spraying solution was prepared by dissolving 9.86 g of dipropionylmethanecobalt (cobalt valence number: 3), 0.65 g of acetylacetonatoiron (iron valence number: 3) and 4.49 g of acetylacetonatochromium in 100 ml of toluene. The glass obtained was subjected to tempering with heating similarly. Evaluation was also made in the same manner.

The results are shown together in Tables 1 and 2.

Comparative Example 2

Heat-radiation reflective glass was produced in the same manner as in Example 1 except that the spraying solution was prepared by dissolving 8.42 g of dipropionylmethanecobalt (cobalt valence number: 3), 0.67 g of acetylacetonatoiron (iron valence number: 3) and 5.91 g of acetylacetonatochromium in 100 ml of toluene. The glass obtained was subjected to tempering with heating similarly. Evaluation was also made in the same manner.

The results are shown together in Tables 1 and 2.

As is seen from Tables 1 and 2, heat-radiation reflective glass causing less change in visible light transmittance even when subjected to tempering with heating and having superior alkali resistance of the film is obtained in Examples 1 to 9. Stated specifically, in the heat-radiation reflective glass of Examples 1 to 9, the visible light transmittance after tempering increased by less than 3% with respect to the visible light transmittance before tempering, and the visible light transmittance after tempering is 35% or less in all Examples, keeping good properties for the protection of privacy. With regard to the sunlight transmittance, it is 35% or less, keeping good heat-radiation reflective properties.

On the other hand, as shown in Table 1, in Comparative Examples 1 and 2, where the cobalt is in a content less than 65% by weight based on the total metal weight per unit area or the chromium is in a content more than 25% by weight based on the total metal weight per unit area, the visible light transmittance greatly increases when the glass is subjected to tempering after the film has been formed. As also shown in Table 2, Comparative Examples 1 and 2 shows a poor alkali resistance.

As shown in Table 1, in Example 6, where the cobalt is in a content more than 90% by weight based on the total metal weight per unit area, only a slight change is seen in the visible light transmittance, but a clouding due to the tempering was seen in the appearance of the film. As also shown in Table 2, in Examples 7 to 9, where the iron is in a content more than 10% by weight based on the total metal weight per unit area and the chromium is in a content more than 8% by weight and less than 18% by weight based on the total metal weight per unit area, the products shown a slightly poor acid resistance.

Example 10

The same base material glass plate as used in Example 1 was fastened with a hanger and stood for 5 minutes in an electric furnace set at a temperature of 650° C. Thereafter, the glass plate was taken out and a spraying solution prepared by dissolving 11.18 g of dipropionylmethanecobalt (cobalt valence number: 3), 1.92 g of acetylacetonatoiron (iron valence number: 3) and 1.90 g of acetylacetonatochromium in 100 ml of toluene was sprayed on the glass plate by means of a commercially available spray gun under conditions of a spray time of about 5 seconds, air pressure of 3.0 kg/cm$^2$, an air flow rate of 90 lit./minute and a spray rate of 20 ml/minute to form the glass-side part of the film. Next, a spraying solution prepared by dissolving 9.80 g of dipropionylmethanecobalt (cobalt valence number: 3), 1.96 g of acetylacetonatoiron (iron valence number: 3) and 3.24 g of acetylacetonatochromium in 100 ml of toluene was sprayed on the glass-side part under the same conditions as the above to form the outermost part. Thus, heat-radiation reflective glass was produced.

Thereafter, the glass was subjected to tempering in the same manner as in Example 1. Evaluation was also made in the same manner. Results obtained are shown in Tables 3 and 4. With regard to the weight percentages of the respective metals, films respectively corresponding to the glass-side part and outermost part were formed on separate glass plates, and their weight percentages in the corresponding parts were separately determined by high-frequency plasma emission spectroscopic analysis. As shown in Table 3, with regard to the layer thickness of the film and the weight percentages of the respective metals in the film, those for each of the glass-side part and the outermost part are shown therein. With regard to the visible light transmittance, sunlight transmittance and appearance, those of the whole film were

TABLE 3

| | Layer thickness (nm) | Weight percentage | | | Visible light transmittance | | | Sunlight transmittance (%) | Appearance |
|---|---|---|---|---|---|---|---|---|---|
| | | Co (%) | Cr (%) | Fe (%) | Before tempering (%) | After tempering (%) | Change (%) | | |
| Example 10 | | | | | | | | | |
| Glass-side part: | 25 | 73 | 13 | 14 | | | | | |
| Outermost part: | 25 | 61 | 26 | 13 | | | | | |
| The whole film: | | | | | 32.6 | 33.0 | 0.4 | 31.0 | Good |
| Example 11 | | | | | | | | | |
| Glass-side part: | 30 | 84 | 5 | 11 | | | | | |
| Outermost part: | 30 | 89 | 5 | 6 | | | | | |
| The whole film: | | | | | 32.0 | 32.3 | 0.3 | 30.8 | Good |
| Comparative Example 3 | 60 | 61 | 26 | 13 | 31.0 | 35.0 | 4.0 | 30.1 | Good |

TABLE 4

| | Alkali resistance | Acid resistance |
|---|---|---|
| Example: | | |
| 10 | A | A |
| 11 | A | A |
| Comparative Example: | | |
| 3 | C | A | evaluated. The total of the layer thickness of the glass-side part and that of the outermost part indicates the thickness of the whole film.

Example 11

Heat-radiation reflective glass was produced in the same manner as in Example 1 except that the spraying solution for forming the glass-side part was prepared by dissolving 12.50 g of dipropionylmethanecobalt (cobalt valence number: 3), 1.88 g of acetylacetonatoiron (iron valence number: 3) and 0.62 g of acetylacetonatochromium in 100 ml of toluene and the spraying solution for forming the outermost part was prepared by dissolving 13.53 g of dipropionylmethanecobalt (cobalt valence number: 3), 0.74 g of acetylacetonatoiron (iron valence number: 3) and 0.73 g of acetylacetonatochromium in 100 ml of toluene. The glass obtained was subjected to tempering with heating similarly. Evaluation was also made in the same manner.

The results are shown together in Tables 3 and 4.

Comparative Example 3

Heat-radiation reflective glass was produced in the same manner as in Example 1 except that the spraying solution was prepared by dissolving 9.80 g of dipropionylmethanecobalt (cobalt valence number: 3), 1.96 g of acetylacetonatoiron (iron valence number: 3) and 3.24 g of acetylacetonatochromium in 100 ml of toluene. The glass obtained was subjected to tempering with heating similarly. Evaluation was also made in the same manner.

The results are shown together in Tables 3 and 4.

As is seen from Tables 3 and 4, heat-radiation reflective glass causing less change in visible light transmittance even when subjected to tempering with heating and having superior alkali resistance and acid resistance of the film is obtained in Examples 10 and 11.

The glass-side part of the film of Example 10 has the same metal weight percentages as the film of Example 9. As shown in Table 2, the film having such metal weight percentages have a slightly poor acid resistance. In contrast, the outermost part of the same Example 10 has the same metal weight percentages as the film of Comparative Example 3. As is clear from Tables 3 and 4, the film having such metal percentages has a poor alkali resistance and cause a great increase in visible light transmittance. However, the film comprised of the combination of the films having such disadvantages has good alkali resistance and acid resistance and cause less change in visible light transmittance as a whole.

That is, when the film having a poor acid resistance is provided as the glass-side part and the film having a poor alkali resistance is provided as the outermost part, it becomes possible to cancel the disadvantages of the respective films and provide a film having good properties as a whole.

Industrial Applicability

As described above, according to the present invention, heat-radiation reflective glass causing less change in visible light transmittance and having superior alkali resistance and acid resistance can be obtained even when subjected to tempering with heating.

Using the heat-radiation reflective glass according to the present invention, heat-radiation reflective glass having superior properties not seen in conventional fabrications can be provided as fabrications of glass with heat treatment, e.g., tempered glass, curved glass, safety glass (or laminated glass), or fabrications comprised of combination of some of these.

What is claimed is:

1. A heat-radiation reflective glass comprising a glass plate and a metal oxide film formed on the glass plate;

said film having composition comprising cobalt, chromium and iron in weight percentages within the ranges shown in condition (1) below, based on the total metal weight per unit area; and having a layer thickness of from 10 nm to 70 nm, (1): cobalt, from 65% to 96%;

chromium, from 2% to 25%; and iron, 10% or less, wherein said chromium is contained in weight percentages that fulfill at least one of the following conditions (2) or (3);

(2): chromium, 8% or less; and (3): chromium, 18% or more.

2. A heat-radiation reflective glass comprising a glass plate and a metal oxide film formed on the glass plate;

said film having composition comprising cobalt, chromium and iron in weight percentages within the ranges shown in condition (5) below, based on the total metal weight per unit area, in its part on the side coming into contact with the glass plate, and in weight percentages within the ranges that fulfill at least one of conditions (6) and (7) shown below, based on the total metal weight per unit area, in its part on the outermost side; and having a layer thickness of from 10 nm to 70 nm, (5): cobalt, from 65% to 96%;

chromium, from 2% to 25%; and iron, from 2% to 33%.

(6): cobalt, from 2% to 96%;

chromium, from 2% to 8% or from 18% to 96%; and iron, from 2% to 96%.

(7): cobalt, from 2% to 96%;

chromium, from 2% to 96%; and iron, from 2% to 10%.

3. The heat-radiation reflective glass according to claim 2, wherein said cobalt is in a content not more than 90% by weight based on the total metal weight per unit area of the part on the side coming into contact with the glass plate.

4. The heat-radiation reflective glass according to claim 2, wherein said film has a double layer construction comprised of the part that is on the side coming into contact with the glass plate and the part that is on the outermost side, the latter being superposingly formed on the former.

5. The heat-radiation reflective glass according to claim 3, wherein said film has a double layer construction comprised of the part that is on the side coming into contact with the glass plate and the part that is on the outermost side, the latter being superposingly formed on the former.

* * * * *